H. K. SANDELL.
FILM WINDING MECHANISM FOR KINETOSCOPES AND THE LIKE.
APPLICATION FILED JUNE 3, 1907.
916,788.
Patented Mar. 30, 1909.
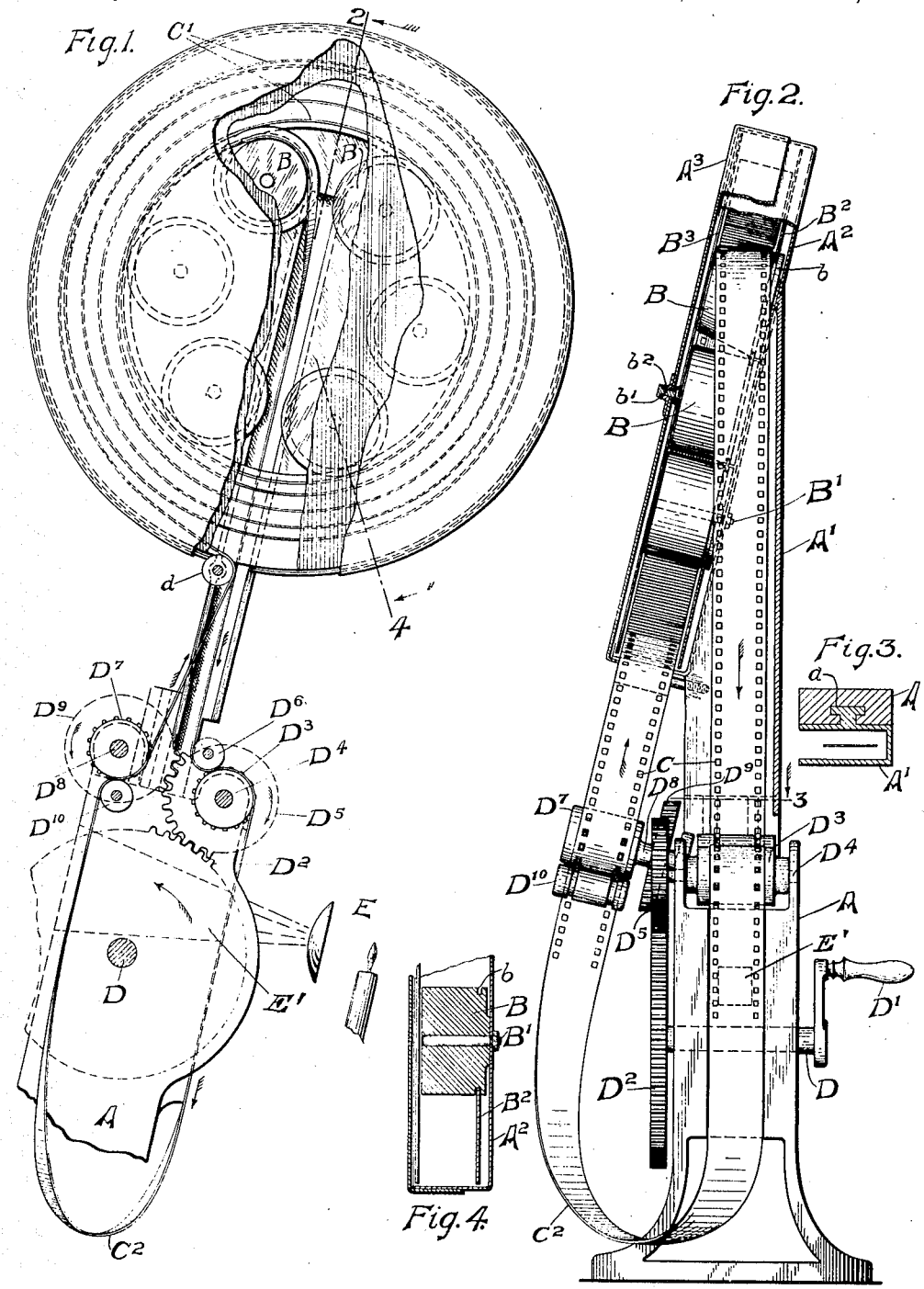
WITNESSES.
John F. Sandell.
Ralph A. Schaefer
INVENTOR.
Henry K. Sandell.
BY Dyrenforth, Lee, Chritton & Wiles,
ATTYS.

UNITED STATES PATENT OFFICE.

HENRY K. SANDELL, OF CHICAGO, ILLINOIS, ASSIGNOR TO HERBERT S. MILLS, OF CHICAGO, ILLINOIS.

FILM-WINDING MECHANISM FOR KINETOSCOPES AND THE LIKE.

No. 916,788.     Specification of Letters Patent.     Patented March 30, 1909.

Application filed June 3, 1907. Serial No. 377,053.

*To all whom it may concern:*

Be it known that I, HENRY K. SANDELL, a citizen of the United States, residing at Chicago, in the county of Cook and State of Illinois, have invented a new and useful Improvement in Film-Winding Mechanism for Kinetoscopes and the Like, of which the following is a specification.

My invention pertains particularly to mechanism involving the use of an endless belt; and my primary object is to provide means whereby an endless belt may be contained and operated in a machine of moderate size for any desired purpose. Such mechanism may be advantageously used in a moving-picture machine, in which an endless belt or film containing or carrying the pictures is mounted and actuated so as to bring the pictures successively before a magic lantern or the like whereby the pictures may be projected on a screen or suitable background.

The invention is illustrated in the accompanying drawing, in which—

Figure 1 represents a broken side-elevational view; Fig. 2, a broken section taken as indicated at line 2 of Fig. 1; Fig. 3, a section taken as indicated at line 3 of Fig. 2, and Fig. 4, a broken section taken as indicated at line 4 of Fig. 1.

In the construction illustrated, A represents a frame or stand having a channel form standard $A^1$ rising therefrom and supporting a slightly inclined shallow-cylinder or flanged disk $A^2$; $A^3$, a flanged disk or cap telescopically connected with the flanged disk $A^2$ and forming therewith a chamber; B, a series of rollers arranged in a circle and mounted on shafts $B^1$ fixedly carried by the disk $A^2$; $B^2$, a ring or annular disk encircling said rollers adjacent to the disk $A^2$ and having its inner periphery received in grooves $b$ with which said rolls are provided adjacent to one end thereof; $B^3$, a revoluble disk located adjacent to the disk $A^3$ and having at its center a fixedly secured stud or shaft $b^1$ rotatable in a bearing $b^2$ with which the disk $A^3$ is provided centrally; C, an endless belt or film having several layers $C^1$ wound upon the rollers B and having a loop portion $C^2$ depending beneath the casing which contains the rollers B; D, a shaft journaled in the stand A and equipped with a crank $D^1$ and a gear $D^2$; $D^3$, a feed-roll mounted on a shaft $D^4$ equipped with a gear $D^5$ meshing with the gear $D^2$; $D^6$, a roll co-acting with the roll $D^3$, the descending portion of the loop $C^2$ passing between the rolls $D^3$ and $D^6$; $D^7$, a roll mounted on a shaft $D^8$ equipped with a gear $D^9$ meshing with the gear $D^5$; $D^{10}$, a roll co-acting with the roll $D^7$, the ascending portion of the loop $C^2$ passing between the rolls $D^7$ and $D^{10}$; and E, means for projecting light through the endless film or belt.

As shown, the descending portion of the loop $C^2$ passes through the channel form standard $A^1$, and the final one of the rollers B from which the loop passes in leaving the casing is made conical to permit that portion of the belt or film to readily assume the vertical position indicated. The rolls $D^3$ $D^6$ are arranged with their axes horizontal so that their cylindrical surfaces will be substantially parallel with that portion of the conical roll B where the belt leaves the roll in the casing. The rolls $D^7$ $D^{10}$ preferably have their axes inclined somewhat and substantially parallel with the axes of the rolls B. It will be understood, therefore, that the feed-rolls are so disposed as to separate the ascending and descending portions of the loop of the endless belt, thereby giving opportunity for projecting light through the film.

The standard $A^1$ may be connected with the base or stand A in any suitable manner. I have shown it connected by a T-shape tongue and groove $a$, as indicated in Fig. 3. The base A is provided with an aperture $E^1$ through which light may pass from the lantern E.

In mounting the endless belt, the belt is first wound upon a drum of substantially the diameter of a circle encircling the rollers B, after which the wound-up portion of the belt or tape is transferred to the rollers B, one end of the tape being then passed through the central opening of the disk $B^2$ and thence between the rollers $D^3$, $D^6$, and the other end of the tape being passed between the rollers $D^7$ $D^{10}$, after which the ends of the tape are joined together. Adjacent to the periphery of the casing in which the rollers B are mounted is preferably provided a roller $d$ over which the ascending portion of the belt passes. It will be understood of course that the flanged disk or removable end A³ of the casing may be taken off at will, the rotatable disk B³ being removable therewith, to permit application or removal of the belt.

Motion may be transmitted to the feed-rolls by turning the crank D¹, and the endless belt will thereby be fed positively at both the descending and ascending portions of the loop C², it being noted that the feed-rolls are geared together. The movement of the tape or endless band causes the rollers B to revolve, thereby avoiding friction.

In the broadest aspect of the invention, the rollers B may be regarded as studs projecting from the flanged disk A² for receiving the windings of the endless belt. It will be understood that my construction provides for the use of a belt of great length without the necessity of using a drum of large diameter, as very many windings of the belt may be supported by the rollers B without in any wise interfering with the operation. Preferably one portion of the loop of the belt leaves the rollers B so as to pass substantially through the axis about which the rollers are grouped, while the other portion of the loop passes to a circumference outside of the circle of the rollers.

The term "belt", as herein employed, is intended to include any flexible member, whatever its composition or cross-section, which it may be desirable to operate in substantially the manner herein shown.

As previously stated the belt or film is wound in layers forming a coil which is placed about the rollers B. As the film in use pays out from the inner winding thereof in its passage past the lens or lamp, and is returned to the outer winding, it necessarily follows that the coil revolves about the rollers during the operation of the device, and to prevent friction between the coil, ring B², and disk B³, which last two members are provided to prevent lateral movement of the windings, they are arranged to revolve in unison with the coil.

It will be understood, of course, that the crank D¹ may be operated in either direction with practically the same facility of operation.

Those skilled in the art of moving-picture machines will readily appreciate the advantage of the mechanical movement herein described in that art.

The foregoing detailed description is given for clearness of understanding only and no undue limitation is to be understood therefrom.

What I regard as new and desire to secure by Letters Patent is—

1. The combination of a plurality of rolls grouped about an axis and disks revoluble about said axis, and arranged adjacent to the ends of said rolls and projecting beyond the outer peripheral portions thereof, said rolls adapted to receive the windings of a belt located between said revoluble disks, for the purpose set forth.

2. The combination of a frame, rolls arranged in a circle about an axis and journaled to said frame and adapted to receive and support an endless belt wound in layers about said rolls and having an unwound loop-portion, revoluble disks located adjacent to opposite ends of said rollers and affording flanges projecting beyond the outer peripheral portions of said rollers, one of said disks being provided with a central opening to permit the belt strand to pass therethrough, and feed-rolls engaging said loop portion.

3. The combination of a stationary casing-member, rolls supported on said member and grouped about an axis and adapted to receive and support an endless belt wound in layers about said rolls and having an unwound loop portion, a removable casing-member supported on said first-named casing-member, said stationary casing having a channel passing from near its center and a channel at its periphery, and feed-rolls engaging the loop portion of the belt.

HENRY K. SANDELL.

Witnesses:
RALPH SCHAEFER,
J. H. LANDES.